United States Patent [19]

Noda et al.

[11] Patent Number: 4,618,020
[45] Date of Patent: Oct. 21, 1986

[54] MOTORCYCLE

[75] Inventors: Azusa Noda, Tokyo; Tadashi Kamiya, Niiza, both of Japan

[73] Assignee: Honda Giken Kogyo Kabushiki Kaisha, Tokyo, Japan

[21] Appl. No.: 156,857

[22] Filed: Jun. 4, 1980

[30] Foreign Application Priority Data

Jun. 6, 1979 [JP] Japan .................................. 54-70784
Jun. 6, 1979 [JP] Japan .................................. 54-70785

[51] Int. Cl.$^4$ ...................... B60K 11/02; B60K 11/04; B60K 11/08
[52] U.S. Cl. ................................ 180/229; 180/68.1; 180/68.4
[58] Field of Search ...................... 180/219, 229, 54 A, 180/68 R, 68.1, 68.2, 68.3, 68.4; D12/110

[56] References Cited

U.S. PATENT DOCUMENTS

| 1,749,424 | 3/1930 | Gordon | 180/54 A |
| 1,856,772 | 5/1932 | Masury et al. | 180/54 A X |
| 2,071,761 | 2/1937 | Nicholson | 180/229 X |
| 2,123,991 | 7/1938 | Fageol | 180/54 A X |
| 2,126,589 | 8/1938 | Turner | 180/68 R X |
| 2,204,926 | 6/1940 | Clingerman | 180/54 A |
| 2,225,914 | 12/1940 | Lewis et al. | 180/219 |
| 4,010,812 | 3/1977 | Bothwell | 180/229 X |
| 4,226,296 | 10/1980 | Higaki | 180/219 |

FOREIGN PATENT DOCUMENTS

| 918188 | 7/1949 | Fed. Rep. of Germany | 180/219 |
| 2640844 | 3/1978 | Fed. Rep. of Germany | 180/229 |
| 1000070 | 2/1952 | France | 180/229 |
| 468447 | 1/1952 | Italy | 180/54 A |
| 477708 | 2/1953 | Italy | 180/229 |
| 162823 | 9/1933 | Switzerland | 180/54 A |
| 232707 | 4/1925 | United Kingdom | 180/229 |

Primary Examiner—Joseph Paul Brust
Attorney, Agent, or Firm—Armstrong, Nikaido, Marmelstein & Kubovcik

[57] ABSTRACT

The present invention discloses a cowling structure of thin sheet material which forms a part of the vehicle frame in which the opposite side sections of the cowling firmly interconnected through the medium of the power propelling unit. Formed in one, or preferably both, of the opposite side sections of the cowling structure is an air outlet opening in which a radiator unit is fitted and a bifurcated air passage duct is defined in the cowling structure by an air-flow dividing guide plate so that an ample air supply is obtained through the front opening of the cowling to the pair of right and left radiator units during vehicle travel. In this manner, a cooling system of highly increased capacity is obtainable without any increase in air resistance of the vehicle. The guide plate also serves to strengthen the cowling structure without any substantial increase in weight.

3 Claims, 7 Drawing Figures

MOTORCYCLE

BACKGROUND OF THE INVENTION

1. Field of the Invention

The present invention relates generally to motorcycles and more particularly to two-wheeled motorcycles of the type including a radiator or a like heat-dissipating device for cooling the power propelling unit.

2. Description of the Prior Art

With conventional two-wheeled motorcycles of the type concerned in which the power unit, arranged between the front and rear wheels, is covered by a cowling structure and the heat-dissipating device is arranged at the front of the power unit, any increase in air passage area of the heat-dissipating device, intended to improve the cooling capacity of the latter, must result in a substantial increase in air resistance of the vehicle, making it difficult to employ any large-sized heat-dissipating device.

On the other hand, any substantial reduction in sheet thickness of the cowling structure, intended for reduction in weight of the vehicle, must result in reduction in rigidity of the cowling structure, rendering the latter liable to vibrate as under wind pressure during vehicle travel. This makes it necessary to provide the cowling structure with some reinforcing members; however, use of such members should be avoided as far as possible to minimize the resulting increase in vehicle weight.

SUMMARY OF THE INVENTION

A two-wheeled motorcycle comprising a rear-wheel drive power unit arranged between the front and rear wheels of the vehicle, a cowling structure of thin sheet material covering said power unit and formed at the front thereof with an air inlet opening and at the side with an air outlet opening, and a power-unit cooling device fitted in said air outlet opening.

The present invention is intended to overcome the difficulties, as described above, previously encountered and has for its object the provision of a two-wheeled motorcycle having a large-capacity power-unit cooling device with an air passage area widely extended without involving any increase in air resistance of the vehicle during travel.

Another object of the present invention is to provide a two-wheeled motorcycle of the character described which includes a lightweight and highly rigid form of cowling structure capable of introducing a large volume of air to the power-unit cooling device with particular efficiency.

These and other objects, features and advantages of the present invention will become apparent from the following description taken in conjunction with the accompanying drawings, which illustrate a preferred embodiment of the invention.

DESCRIPTION OF THE PREFERRED EMBODIMENT

Figure 1:
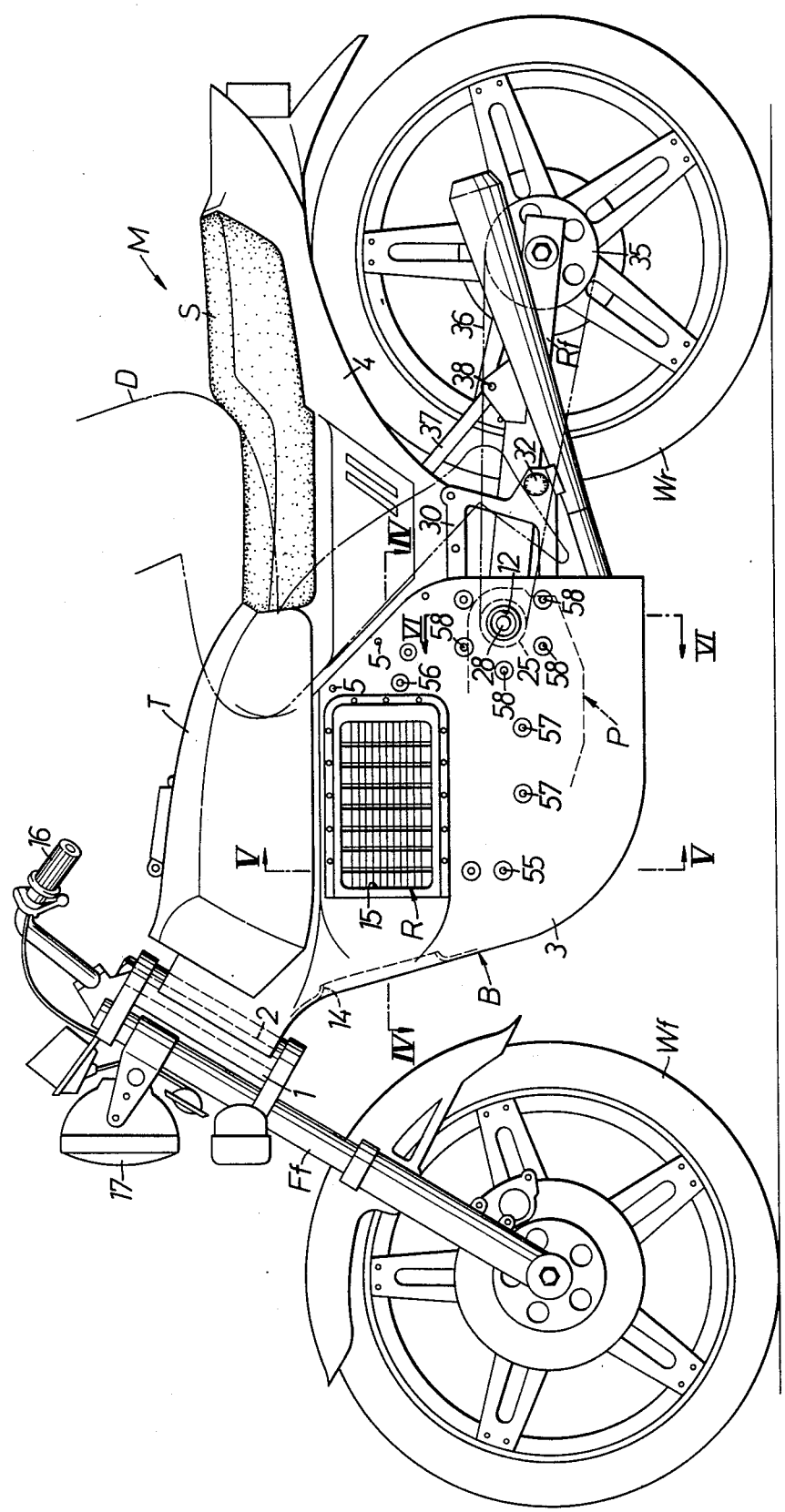
FIG. 1 is a general side elevational view of a two-wheeled motorcycle embodying the principles of the present invention.
Figure 2:
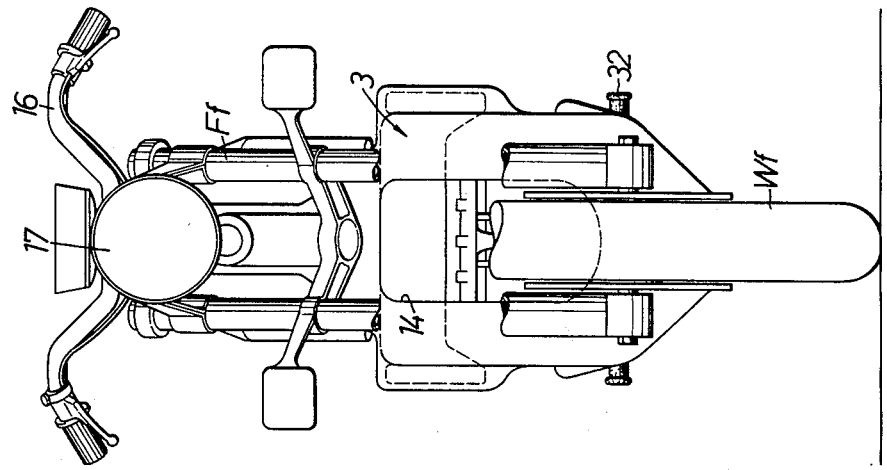
FIG. 2 is a front elevational view, partially broken away, of the same.

Referring to the drawings and first to FIGS. 1 and 2, the two-wheeled motorcycle illustrated, M, comprises a vehicle frame B having a head pipe 1 disposed at the front end thereof, a front fork $F_f$ mounted on the head pipe 1 through the intermediary of a steering shaft 2 and supporting a front wheel $W_f$, a power unit P accommodated in the vehicle frame B, and a rear fork $R_f$ pivotally connected at its front end to the power unit P and rotatably supporting at the free end a rear wheel $W_r$ on the opposite sides thereof.

Figure 3:
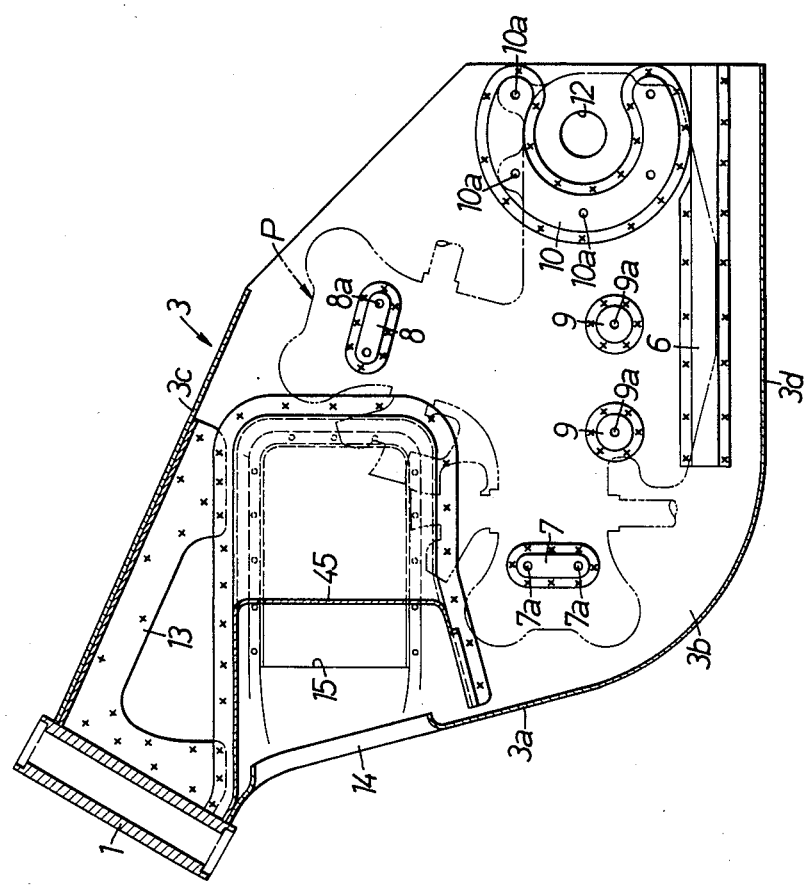
FIG. 3 is a side elevation, in longitudinal cross section, of the cowling structure.

Description will next be made of the construction and arrangement of these vehicle components in order:

First, the vehicle frame B consists of a cowling structure 3 of thin sheet material firmly secured at the front end to the head pipe and extending rearwardly downward therefrom and a seat stay 4, of channel cross-section, detachably connected to the rear end of the cowling structure 3 by screw means 5 and covering the top portion of rear wheel $W_r$. As shown in FIG. 3, the cowling structure 3 includes a front section 3a, right and left side sections 3b, a roof section 3c and a bottom section 3d and, as a whole, takes the form of a streamlined shell structure opening rearwardly. An air inlet opening 14 is formed in the front section 3a of the cowling structure 3 and a pair of air outlet openings 15 are formed in the respective side sections 3b in opposing relation to each other.

Figure 4:
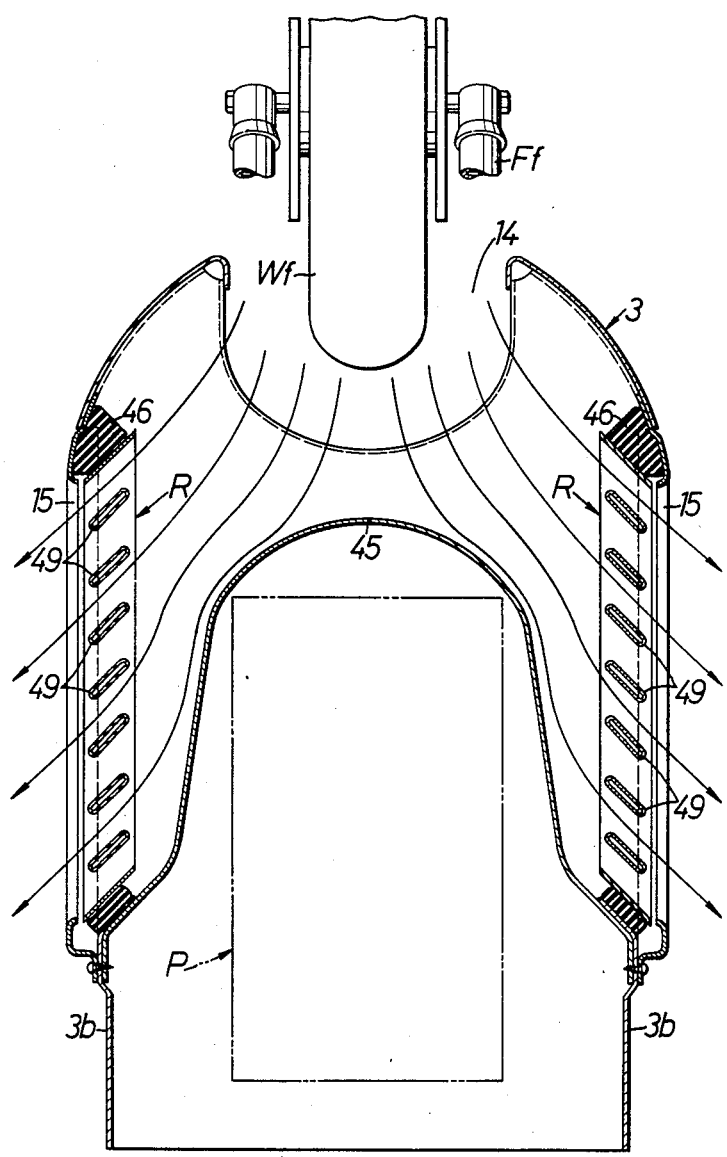
FIGS. 4, 5 and 6 are cross-sectional views, on an enlarged scale, taken along the lines IV—IV, V—V and VI—VI, respectively, in FIG. 1.

Provided in the cowling structure 3 in fixed relation thereto is an air-flow dividing partition or guide plate 45 which defines within the cowling structure 3 a bifurcated air passage duct which serves, during vehicle travel, to divide the flow of air entering the cowling structure 3 through the air inlet opening 14 into two separate streams smoothly directed to the right and left air outlet openings 15 on the opposite sides of the cowling structure 3 (FIG. 4). The air-flow dividing guide plate 45 also serves to increase the rigidity of the cowling structure 3 by interconnecting the opposite side sections 3b of the latter.

Figure 5:
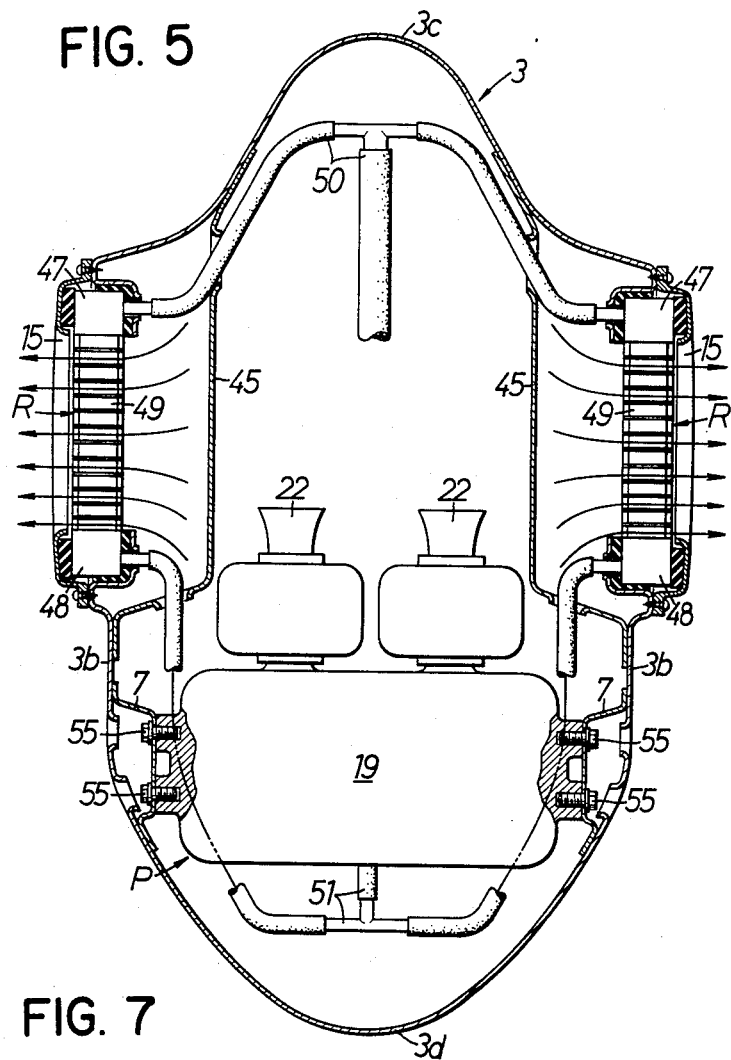

As clearly seen in FIGS. 4 and 5, a pair of radiators R, which constitute the power-unit cooling device, are fitted in the right and left air outlet openings 15 through the medium of respective elastic members 46 and each comprise a pair of top and bottom water tanks 47 and 48 and a plurality of flattened water tubes 49 extending therebetween. As clearly seen in FIG. 4, the opposite flat side surfaces of water tubes 49 extend in parallel to a vertical plane inclined outwardly rearward of the vehicle. The top water tanks 47 of the two radiators R are connected to the coolantoutlet port of power unit P by conduit means 50, the bottom water tanks 48 being connected to the coolant inlet port of power unit P by conduit means 51.

During travel of the vehicle, large air streams are formed through the cowling structure 3 which flow in the direction from the air inlet opening 14 to the air outlet openings 15, as indicated by the arrowed lines in FIG. 4, under the combined effect of the ram pressure acting in the air inlet opening 14 and the suction acting in the air outlet openings 15 and also under the guide effect of the air-flow dividing guide plate 45. Such air streams, flowing around the flattened water pipes 49 of the radiators R, serve effectively to cool the water pipes. The water pipes 49, being inclined as described above, cause no substantial hindrance to the streams of cooling air. The flows of coolant water as cooled in the two radiators R, leave the respective bottom water tanks 48 and are joined together by conduit means 51 to enter the power unit P. The combined flow of coolant water, having served to cool the power unit, is divided by conduit means 50 into two separate flows to return to the top water tanks 47 of the two radiators R.

Further, as clearly seen in FIG. 3, there are provided on the inside surfaces of the right and left side sections 3b of the cowling structure 3 a pair of guide rails 6 which extend horizontally in a front to rear direction and a plurality of pairs of reinforcing and power-unit supporting bosses 7 to 10. The guide rails 6 and bosses 7 to 10 are firmly secured to the adjacent side sections of the cowling structure 3 as by welding in face-to-face relation to the sides of power unit P. Among others, the bosses 10 in the rearmost pair are shaped in a circular arc or C-shaped and axially aligned with the output shaft 11 of the power unit P. Also, the bosses 7 to 10 are formed with respective bolt holes 7a to 10a at an appropriate location or locations, as shown, and, among others, the C-shaped bosses 10 are also formed each with a tool window or opening for tool insertion 12 at its center.

The cowling structure 3 described above is formed either as a single integral unit or in appropriately divided form of a lightweight material such as light alloy or synthetic resin and has no practically effective strength itself. Reference numeral 13 indicates a patch member bonded to the inside surface of the top portion of cowling structure 3 to reinforce the latter around its connection with the head pipe 1.

Provided on top of the cowling structure 3 is a fuel tank T in straddling relation thereto. Mounted on the seat stay 4, which extends rearwardly from the tank T, is a seat S for the driver D to sit thereon in a straddling fashion.

The front fork $F_f$ is of telescopic construction with a steering handle 16 and a headlight 17 fitted, respectively, to the top end and to the front face thereof.

Figure 7:
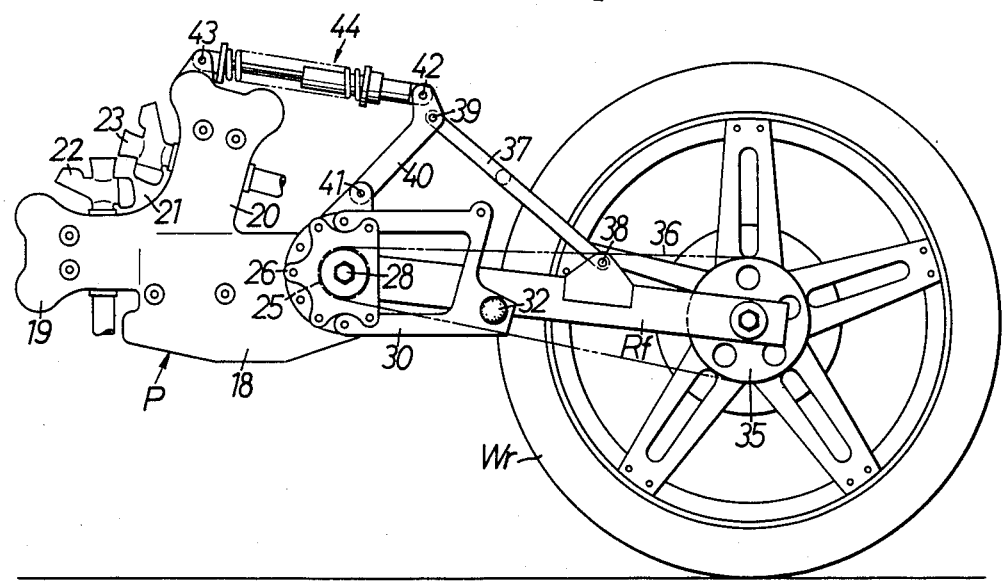
FIG. 7 is a side elevation of the power unit and rear fork assembly.

Description will next be made of the power unit P. As best seen in FIG. 7, the power unit P includes a crankcase 18 and two of multiple-barrel cylinder blocks 19 and 20 projecting from the front portion of the crankcase 18 in angular relation to each other. Arranged in the V slot or angular space 21 defined between the cylinder blocks 19 and 20 are a pair of carburetors 22 and 23 associated with the respective cylinder blocks 19 and 20.

Figure 6:
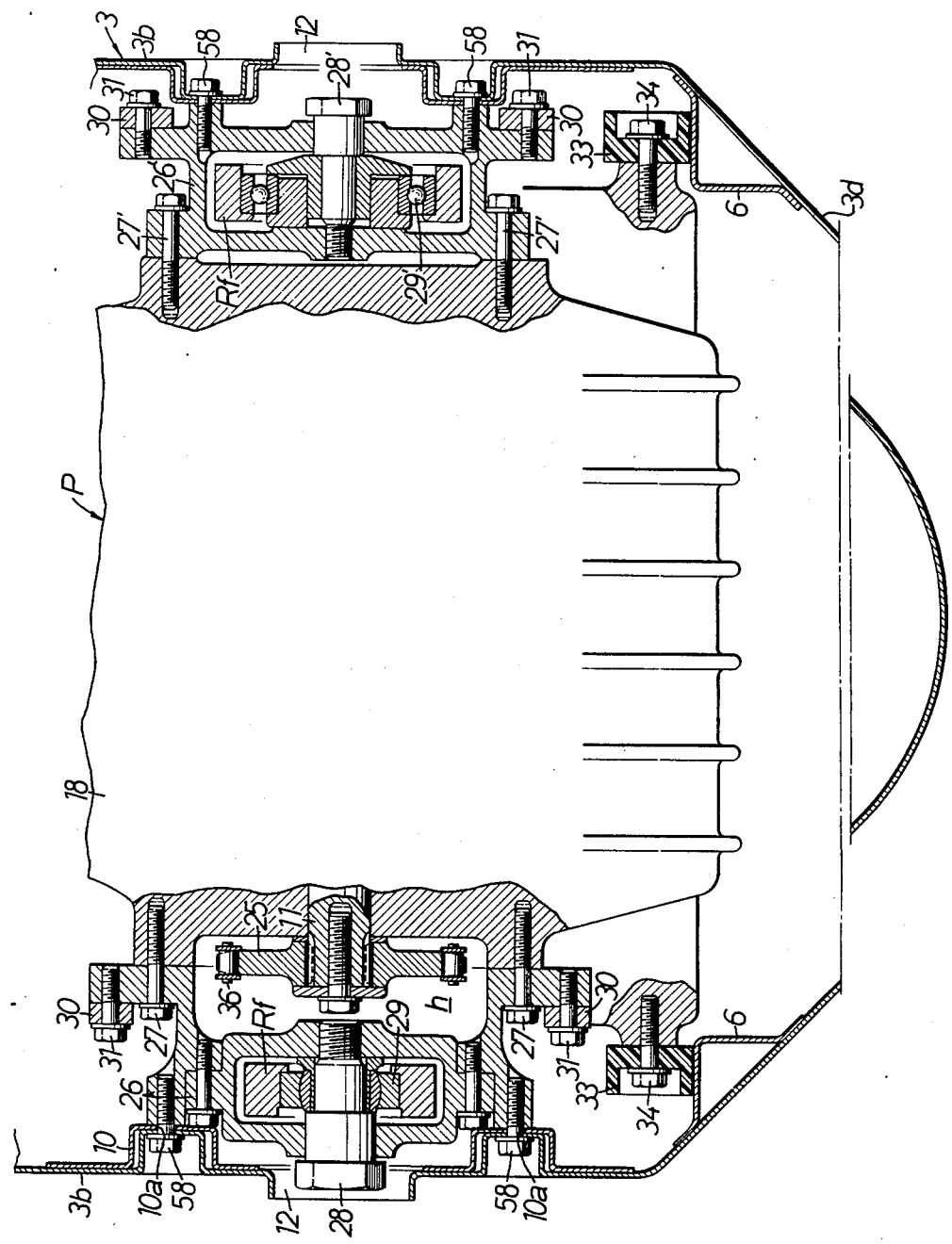

As shown in FIG. 6, a driving sprocket wheel 25 is fixedly mounted on the output shaft 11 of power unit P, which extends exteriorly of the crankcase 18 through the left side wall thereof. The sprocket wheel 25 is in a housing space h defined by an adapter 26 which is fixed to the left side of the crankcase 18 by bolts 27. Also, an adapter 26' is fixed to the right side of the crankcase 18 by bolts 27' in a position opposite to the adapter 26. A pair of pivot shafts 28 and 28', arranged axially in alignment with the output shaft 11, are removably threaded in the respective adapters 26 and 26'. The rear fork $R_f$ is pivotally mounted at its right and left front basal ends on the pivot shafts 28 and 28' through the intermediary of respective bearings 29 and 29'.

Further, a pair of parallel brackets 30 are firmly secured to the respective adapters 26 and 26' by bolts 31 and each have a bar-like step 32 secured thereto, as seen in FIGS. 1 and 7.

As shown in FIG. 6, there are provided on the right and left sides of the crankcase 18 a pair of slide members of synthetic resin material, 33, which are secured to the crankcase by bolts 34 and slidable over the respective guide rails 6 on the inside of the cowling structure 3.

The rear wheel $W_r$, rotatably supported on the rear fork $R_f$ at the rear end thereof, has a driven sprocket wheel 35 secured coaxially thereto and a drive chain 36 is trained under tension between the driving and driven sprocket wheels 25 and 35, as shown, With this arrangement, the output of power unit P is transmitted from the output shaft 11 through the driving sprocket 25 and chain 36 to the driven sprocket 35 to drive the rear wheel $W_r$.

In order to prevent any unusual strain occurring in the area of pivotal connection of rear fork $R_f$ even with more or less deformation of the left leg of the rear fork under the tension of the drive chain 36, the bearing 29 on the pivot shaft 28, which lies adjacent to the output shaft 11 of power unit P, takes the form of a spherical bearing, as illustrated, so that smooth up and down rocking movement of the rear fork $R_f$ is ensured.

Further, since the output shaft 11 and pivot shafts 28 and 28' are arranged in axial alignment with each other, as described above, the distance between the driving and driven sprockets 25 and 35 and hence the tension of the drive chain 36 remain unchanged at all times irrespective of the vertical position of the rear fork $R_f$ in its rocking movement.

As shown in FIG. 7, a strut link 37, of bifurcated form, is pivotally supported 38 at its basal, rear ends on the right and left legs of rear fork $R_f$ at a point midway thereof in straddling relation to the rear wheel $W_r$ for free vertical rocking movement. Provided in front of the strut link 37 is a rocker link 40 which is pivotally supported at its basal end 41 on the top of crankcase 18 for fore and aft rocking movement. The strut and rocker links 37 and 40 are pivotally connected with each other at their distal ends as indicated at 39. Interposed between the rocker link 40 and one of the cylinder blocks, 20, is a single unit of shock absorber 44 fitted with a suspension spring and which unit is pivotally connected at its opposite ends to the rocker link 40 and cylinder block 20, as indicated at 42 and 43. Incidentally, the shock absorber 44 may be connected at its fixed end, that is, at its front end to the rear end of the top of cowling structure 3, if desired.

Vertical rocking movement of the rear fork $R_f$ causes fore and aft rocking movement of the rocker link 40 through the intermediary of strut link 37 thereby to cause the suspension spring and shock absorber unit 44 to expand and contract. It will be noted, therefore, that the single suspension spring and shock absorber unit 44 serves not only to support the rear fork $R_f$ but also serves as an effective cushioning unit for the rear fork $R_f$ in its vertical rocking movement during vehicle travel.

In assembling the two-wheeled motorcycle M, the cowling structure 3 and power unit P are connected together in the following manner.

First, the power unit P is inserted into the cowling structure 3 from behind the latter by placing the slide members 33 in sliding engagement with the respective guide rails 6 until it is set in a predetermined position in the cowling structure. Subsequently, the bosses 7 to 10 on the opposite side sections 3b of cowling structure 3 are firmly fixed to the power unit P by means of fastening bolts 55 to 58, which are inserted into respective bolt holes 7a to 10a from outside of the cowling structure 3. Among others, the C-shaped bosses 10 are clamped against the respective adapters 26 and 26' on the opposite sides of power unit P with the result that the opposite side sections 3b of cowling structure 3 are firmly secured to the power unit P particularly around the pivot shafts 28 and 28', on which the rear fork $R_f$ is mounted. In this, manner, the power unit P serves solidly to interconnect the opposite side sections 3b of cowling structure 3, thus acting as reinforcing or stiffening member effective to impart a practical strength to the cowling structure 3.

In the normal position of the driver D during vehicle travel, in which his feet are laid on the right and left steps 32 with the fuel tank T held between his knees, as seen in FIG. 1, his legs are both held concealed behind the cowling structure 3 and this, together with the streamlined configuration of the latter, makes the air resistance of the vehicle during travel extremely small.

In the state of the power unit P connected with the cowling structure 3, when it is desired to separate the rear fork $R_f$ from the power unit P for maintenance work such as renewal of the drive chain 36, it is only required that an appropriate tool is inserted through the right and left tool windows 12 into the cowling structure 3 in order to draw the pivot shafts 28 and 28' out of the respective bearings 29 and 29' thereby to disconnect the rear fork $R_F$ at its basal ends from the adapters 26 and 26' and there is no need for removing the power unit P once connected with the cowling structure 3 therefrom. This enables the maintenance operation to be performed with particular ease and efficiency.

To summarize, according to the present invention, the rear-wheel driving power unit arranged between the front and rear wheels is housed in a cowling structure formed of thin sheet material which is formed at its front with an air inlet opening and at least one of the opposite sides of the cowling with an air outlet opening and a heat-dissipating device such as a radiator for cooling the power unit is fitted in the air outlet opening. This means that the power unit can be fitted with a large-capacity cooling device having a side air passage area without increasing the front area, i.e., the area of forward projection, of the power unit and cowling assembly to any extent and permits a marked reduction in air resistance of the vehicle under the flow-straightening effect of the cowling structure. Moreover, the cooling system can be supplied with an ample volume of cooling air under the combined effect of the ram pressure and suction in the air inlet and outlet openings so that the cooling capacity of the system is largely increased.

Specifically, the cowling structure formed in its right and left sections with air outlet openings to receive a pair of right and left cooling units not only enables realization of a cooling system further increased in capacity as a whole assisting in reducing the air resistance of the vehicle but is also highly effective to improve the stability of the vehicle during travel due to the fact that the vehicle is well balanced in weight laterally thereof with the arrangement of the paired cooling units.

Furthermore, the right and left side sections of the cowling structure are interconnected by an air-flow dividing guide plate which defines a bifurcated air passage duct in the cowling structure between the air inlet and outlet openings and in which duct the cooling components such as radiators are installed. As will readily be noted, the guide plate also serves to reinforce the cowling structure, eliminating or reducing the need for employing any extra reinforcing members. In this manner, the cowling structure is substantially increased in rigidity in spite of its light-weightness so as to be free from any vibration during vehicle travel and, accordingly, the driving stability of the vehicle is ensured with substantial reduction in vehicle weight.

In the foregoing embodiments, the fairing structure covers substantially the entire portion of the power unit but may instead be formed to cover a part of the power unit.

Accordingly, while there have been shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

What is claimed is:

1. A two-wheeled motorcycle comprising:
   (a) a rear-wheel driving power unit arranged between the front and rear wheels of the vehicle;
   (b) a cowling structure of thin sheet material covering said power unit and formed at the front thereof with an air inlet opening and including a right and a left side section, each formed therein with an air outlet opening in a side surface thereof;
   (c) an air-flow dividing guide plate interconnecting said right and left side sections of said cowling structure, defining in the latter a bifurcated air passage duct extending between said air inlet opening and said air outlet openings; and
   (d) a pair of right and left radiators connected with said power unit and arranged in the respective leg portions of said bifurcated air passage duct positioned in said air outlet openings in the opposite side surfaces of said cowling structure.

2. The two-wheeled motorcycle as recited in claim 1 in which said cowling structure, having a head pipe fixedly mounted on the front end thereof, forms part of the vehicle frame and exhibits a strength required as such with the right and left side sections of said cowling structure firmly connected with each other through the intermediary of said power unit interposed therebetween.

3. The two-wheeled motorcycle as recited in claim 1 in which said radiators each comprise a pair of top and bottom water tanks and a plurality of flattened water pipes extending between said water tanks in fluid communication therewith, the opposite flat side surfaces of said water pipes extending in parallel to a vertical plane inclined outwardly and rearwardly of the vehicle.

* * * * *